United States Patent
Marler

(10) Patent No.: US 8,246,711 B2
(45) Date of Patent: Aug. 21, 2012

(54) FERTILIZERS AND METHODS FOR USING BIOTIC SCIENCE TO FEED SOILS

(76) Inventor: John Marler, Bellevue, WA (US)

( * ) Notice: Subject to any disclaimer, the term of this patent is extended or adjusted under 35 U.S.C. 154(b) by 331 days.

(21) Appl. No.: 12/360,500

(22) Filed: Jan. 27, 2009

(65) Prior Publication Data

US 2009/0188290 A1 Jul. 30, 2009

Related U.S. Application Data

(60) Provisional application No. 61/023,986, filed on Jan. 28, 2008.

(51) Int. Cl.
*C05D 9/02* (2006.01)
*C05F 11/00* (2006.01)
*C05F 3/00* (2006.01)
*C05B 17/00* (2006.01)

(52) U.S. Cl. ............. 71/21; 71/11; 71/12; 71/13; 71/20

(58) Field of Classification Search .................. 71/1–63; 405/263; 426/69, 285, 453, 644, 647, 657, 426/807

See application file for complete search history.

(56) References Cited

U.S. PATENT DOCUMENTS

| | | | | |
|---|---|---|---|---|
| 3,939,280 A | * | 2/1976 | Karnemaat | 426/2 |
| 4,872,899 A | * | 10/1989 | Miller | 71/11 |
| 5,021,077 A | * | 6/1991 | Moore | 71/17 |
| 5,772,721 A | * | 6/1998 | Kazemzadeh | 71/11 |
| 6,293,047 B1 | * | 9/2001 | Acey | 47/58.1 R |
| 6,863,826 B2 | * | 3/2005 | Sheets | 210/705 |

* cited by examiner

*Primary Examiner* — Colleen Dunn
*Assistant Examiner* — Jennifer Smith
(74) *Attorney, Agent, or Firm* — Marvin A. Motsenbocker; Mots Law, PLLC

(57) ABSTRACT

Biotic fertilizers are described that build soil nutrients by accelerating the growth of topsoil microorganisms Biotic fertilizers are primarily aimed at increasing populations of cyanobacteria, formally known as blue-green algae, and like organisms that have the ability to engage in photosynthesis reand to engage in the extraction of nitrogen from the atmosphere. Methods of biotic fertilizer manufacture are presented that utilize animal waste product as well as desirable compositions obtained thereby.

20 Claims, No Drawings

FERTILIZERS AND METHODS FOR USING BIOTIC SCIENCE TO FEED SOILS

CROSS REFERENCE TO RELATED APPLICATIONS

This application receives priority from U.S. patent application No. 61/023,986 filed on Jan. 28, 2008 under 35 USC 119, the entire contents of which are incorporated by reference.

FIELD OF THE INVENTION

The invention relates to biotic fertilizers, to topsoil health and fertility, and to methods of making and using precision biotic fertilizers to feed soil microorganisms to increase topsoil fertility by mimicking and accelerating natural fertility.

BACKGROUND OF THE INVENTION

Chemical science has ruled agronomy for over 160 years since Justus von Liebig invented chemical concepts that led to the development of the modern synthetic nitrogen fertilizer industry. Liebig originated the notion that inorganic nitrogen is the primary element necessary to increase fertility in soil for agriculture. Although agronomists always have had some knowledge of soil microorganisms, most agronomists practicing today view the soil as a complex chemistry set, to be modified by addition of specific chemicals.

Modern agronomists believe that chemicals are necessary to "balance" the soil and that chemicals applied in addition to fertilizers should be relied on to drive growth and eliminate fungus and disease. In particular, the "nitrogen cycle," accepted for the last 150 years as an absolute reality, essentially postulates that all plants can only digest inorganic forms of nitrogen. Soil scientists originated the concept of the "nitrogen cycle" in the nineteenth century. They found a ratio of 70% inorganic nitrogen to 30% organic nitrogen in the lakes and rivers of industrial countries and postulated that this was the natural order of soil chemistry. Over a century of time well meaning scientists reinforced and expanded the concept as established dogma, with additional discoveries. From this pure chemical view, an entire industry of commercial agriculture has established, focusing on inorganic synthetic nitrogen fertilizers.

In the early 1990's at an organics conference in Austin, Tex. a doctor of agronomy from Texas A&M University stood up and made the statement that all anyone needs to grow anything is N—P—K. He was, of course, talking about the three most important nutrients that a plant requires for growth, nitrogen (N), phosphate (P), and potash (K). He then proceeded to prove with his slides that you could grow plants in gravel or sand with N—P—K. This raw belief in chemical universally prevails in agriculture even today. Those trained only in chemical based agronomics often believe that topsoil merely is a medium into which they can pour chemicals to grow just about anything. Many agronomists believe that synthetic inorganic nitrogen fertilizers and technical advances in genetics will continue the green revolution for hundreds of years past their deaths.

With such background belief in high energy intensive chemistry practices driving modern farming techniques, there has been little alarm about topsoil loss from the commercial agriculture community. However this is a serious problem from the view of long term sustainability as well as from the view of energy use. In fact agricultural soils in the United States have lost 85% of their minerals content compared to that of 100 years ago (Rio Earth Summit, 1992). This phenomenon has been documented worldwide. Researchers found that soils in Africa have seventy-four percent less minerals, soils in Asia have seventy-six percent less minerals, soils in Europe have seventy two percent less minerals, soils in South America have seventy-six percent less minerals and in Canada, soils have eighty-five percent less minerals than 100 years ago. This loss has been documented along with a corresponding loss in arable topsoil. The USDA, FAO, and other major agriculture organizations agree that worldwide topsoil loss exceeds 50% in most places and continues deteriorating at the rate of about 1% a year. Topsoil, the top 6" of soil in which the atmosphere can penetrate, is critical to the growth of healthy crops. University testing indicates healthy topsoil supports a 17% higher rate of food production when compared to non-topsoil soil components alone in the form of sand, silt, and clay fertilized with N—P—K conventional fertilizers. Without topsoil plants are less healthy and are unable to contain higher levels of minerals which are responsible for the creation of vitamins found in plants.

Carbon, or soil organic matter, in the form of stored stable chelated nutrients is the primary component of topsoil other than the basic matter of the soil which is sand, silt, or clay or a combination thereof. Carbon materials found in topsoil are the result of past and present lives of soil microorganisms. These Carbon materials, known as soil acids, glomalin, and other organic produced by-products, are the products from the lives of populations of soil microorganisms. Such Carbon materials are the basis of natural fertility in a soil. Their presence enables the growth of secondary soil microorganisms and the consumption of plant detritus. Together, such growth works to increase natural topsoil fertility through the deposit of additional microorganism waste. The life forms that together generate these nutrients are the basis of natural topsoil fertility.

Natural fertility is a unique form of fertility having the benefit of being made up, in large part, of chelated elemental minerals. Chelated minerals are those elemental minerals which have formed into a six sided Carbon molecular structure. These structures link together to form complex polymer chains in topsoil. All minerals essential to plant growth are contained in these molecular structures. Plants that access these molecular structures by their root structures can uptake and directly use chelated minerals from these molecules since the elemental minerals have been pre-digested by the soil molecules into a form that plants can readily use.

Biotic fertilizers are designed to build these nutrients in the soil by accelerating the growth of topsoil microorganisms Biotic fertilizers are primarily aimed at increasing populations of cyanobacteria, formally known as blue-green algae, and like organisms that have the ability to engage in photosynthesis and to engage in the extraction of Nitrogen from the atmosphere. Cyanobacteria are omnipresent in all soils in all places on this earth. The design and manufacture process used to produce biotic fertilizers are specifically designed and manufactured to provide the maximum acceleration of a cyanobacteria population and like organisms. The life cycles of cyanobacteria and like organisms are the most efficient converters of organic nutrients into stored organic nutrients in topsoil in the form of balanced chelated minerals into a soil. These nutrients, as demonstrated in the following table "A", are the nutrients needed to grow a plant to its full genetic potential.

TABLE "A"

|  | Element | Lbs. |
|---|---|---|
| Yield of 1,000 lbs of cyanobacteria protein 1,000 lbs of cyanobacteria protein can yield these minerals as a result of protein synthesis. | Nitrogen | 140 |
|  | Phosphorus | 30 |
|  | Potassium | 10 |
|  | Sulfur | 10 |
|  | Magnesium | 5 |
|  | Iron | 2 |
|  | Trace Minerals | Proportionate |

It is the combined presence of minerals, stored carbon forms of organic nutrients, and large populations of air breathing topsoil microorganisms that constitutes the top level of soil known as topsoil. Soil acids, the primary form of "A" Horizon Carbon is responsible for holding the soil together and preventing erosion. Soil acids have the ability to hold up to 97% of their weight in moisture in a complex matrix which stores water in the soil. These acids also act to hold soil particles together, protecting the surface of healthy topsoil from erosion by wind and rain.

Healthy arable topsoil is vital for the continuation of the current level of population on earth. If, as the USDA and FAO maintain, the earth is losing arable topsoil at the rate of 1% a year then the loss of fertility will, at some time, impact the ability of humankind to feed the population of the earth which has expanded greatly in the last half-century. Ironically, it is the opinion of the inventor that the principal cause of this loss may be due to conventional N—P—K type fertilizers based on forms of water soluble synthetic inorganic nitrogen. The rapid increase in observed erosion and loss of arable topsoil worldwide coincides with the introduction and large scale availability of synthetic inorganic nitrogen fertilizers. Topsoil has a natural nitrogen—carbon balance. When that balance is upset as a result of the application of synthetic water soluble Nitrogen then soil microbes are encouraged to increase their consumption of the stored carbon contained in the topsoil. When too much synthetic Nitrogen is applied to the soil it accelerates topsoil microorganisms to consume stored carbon eliminating the "glue" that holds the soil particles together. In this manner topsoil, and its attendant ability to prevent erosion, is destroyed. The result is a loss of natural fertility and a loss of the soil to retain its defenses against the erosion that is a result of weather. This long term destruction has been masked by the increase in crop production that has been enabled by energy intensive combustion of fossil fuels for fixing nitrogen and addition of various nutrients to the soil for short term use.

The destruction of arable topsoil is one of the most important problems ever faced by mankind. Civilizations collapse when soil fertility collapses. One-half the area of present China was once covered with a vast temperate-zone forest. This forest was eliminated before recorded history by the expansion of the empires of China. For thousands of years since then, China has suffered some of the worst erosion in the world. The Yellow Sea is named for the surrounding land's eroding yellow loess soils carried into it by the rivers.

The empires of Sumer and Babylon in the watershed of the Tigris-Euphrates River collapsed after irrigation for agriculture and overgrazing destroyed their lands. Today one-third of the otherwise arable land of Iraq cannot be used because it is still saline from irrigation of 5,000 years ago. The mouth of the Tigris-Euphrates River has extended itself 185 miles into the gulf as the fertility of that hapless land has washed into the sea. Every empire has run, and still runs, a net deficit of the fertility of the earth in order to sustain the unnatural growth and material consumption of its population. The cultural history of Babylon can be traced through time to denuded Greece and to Rome, which eroded the soil of that peninsula. If the United States had to stop its fossil fuel intensive feeding of raw chemical nutrients to agricultural land to replenish the minerals lost as topsoils here, without a suitable alternative, Americans likewise would face a devastating threat to their living standards.

Of course, organic soil amendments and some fertilizers have been used to put nutrient waste back into soil. However, much of that art is filled with misunderstandings and engenders new problems Growers who dump unprocessed and unstable animal waste sludge on land often see an increase in salt levels and metal toxins. Such practice may result in air quality problems as nutrients, driven by bacteria decomposition volatilize into the atmosphere in the form of CO2, methane, ammonia, and hydrogen sulfide. This can occur with great rapidity. According to University studies as much as 25% of contained Nitrogen can be lost within the first 24 hours after application. Particulate from these materials often become airborne as well providing health problems for area residents. In addition to atmospheric pollution, there is also ground water and surface water pollution that may result from the practice of dumping unprocessed manure on land. Mineral nutrients, primarily phosphates, nitrate, and nitrites, often leaches into water causing pollution.

A variety of mechanical treatment methods have been proposed to stop bacterial activity of feedstock used in organic fertilizers. For example, Connell (U.S. Pat. No. 5,466,273) suggested mixing lime with an organic feedstock using a vertical cyclone such as a Mobile PowerMaster 250™ to grind and make a high pH product. Connell reported that the "result" of this "first grinding" is a "stabilized" material (i.e. "halting the growth of the microbe populations") with "a basic pH of approximately between 8 and 11," wherein the high pH is an "aid in disinfection of the organic feedstock." Later steps include adding micronutrients and strong acid to lower the pH back down again from the high pH condition "by a standard acid/base reaction" to neutralize the carbonate ions as carbon dioxide gas." Unfortunately, this method requires extensive processing, starting with a grinder and at least two pH changes.

Recent awareness of the need for more "organic" fertilizers has led to a spate of patents. See U.S. Pat. No. 7,024,796, which teaches the use of high temperature gas turbine drying of animal waste feedstock to meet the need "for production of organic fertilizer and soil builder products." Unfortunately that method "cooks" the organic material and in part, "destroys" components with 1000 degree heat. Not surprisingly, as a result of this high heat, "starch, protein, carbohydrate and sugar components are converted to glutenous-like materials" which are a less soluble form and not readily usable by soil biota. This focus on high temperature (energy intensive) baking and reliance on exogenous inorganic nutrients is further represented by U.S. Pat. No. 6,846,343, which teaches baking at 300 degrees Fahrenheit or more, again with the goal of supplying minimum amounts of nitrogen, phosphorous and potassium and other essential minerals for plant growth.

Thus, despite the recent popularity of "organic fertilizers" the composition of such "natural" fertilizers remain fixated on the classical chemistry approach of using fertilizer itself as a kind of medium to feed plants a balanced nitrogen, phosphorus, potassium and mineral composition for direct plant feeding. The nutrient requirements of soil microorganisms generally is not addressed in a comprehensive way.

This focus on plant nutrient absorption to the exclusion of the soil biota can be seen in nitrogen usage. Nitrogen often is added as ammonia or urea. These forms of nitrogen are converted into nitrite and nitrate for plant use, or at least the portions of applied nitrogen that do not volatize and become lost in the atmosphere. This well-known biological nitrification is a two step process that begins with ammonia conversion to nitrite and then nitrite oxidation to nitrate. In fact, companies such as United-Tech sell specially selected microorganisms for this process. In contrast, the opposite direction of ammonia conversion to urea and of urea carboxylation to more stable forms is disfavored. The industry shares a conviction that higher complexed carbon forms of nitrogen in the soil are not helpful to plant growth. Thus, the alternative reactions are generally poorly understood, ignored, or simply deemed undesirable for fertilizer manufacture. An example of this is the bacterial enzyme urea carboxylase, which still is poorly understood. Even the discovery of the characteristics of a representative enzyme merited publication in a major journal as recently as 2004. See Kanamori et al. J. Bacteriology May 2004; 186(9):2520-2.

In sum, fertilizer manufacture and desired compositions taught in this field reflect the requirements for feeding plants directly. Macro nutrients and micro nutrients such as N, PO4, S, K, Mg, Fe, B and Mo are supplied essentially without regard to the needs of soil bacteria and fungi. Any detailed analysis of nutrient fate usually centers on interactions in the soil that maintain solubility for use by the plant. Recently, for example, organic acids such as citrate have been used to complex minerals for absorption, as for example described by U.S. Pat. No. 5,372,626 issued to Zivion et al. and entitled "Fertilizer compositions for administering ionic metal microelements to plant roots." However, such publications stress the use of small, stoichiometric amounts of citrate for this purpose. A molar ratio of citrate to metal ions of about 0.5-2.5 is taught, with a ratio of about 1.0 to about 1.5 being particularly preferred, in alkaline and neutral soils as well as acid soils.

Also see for example U.S. Pat. No. 5,797,976, issued to Yamashita in Aug. 25, 1998 "([a] central theme of any effective soil management program relies on maintaining the organic matter and thus microbial fractions of the soil. Several species of microbes can harvest atmospheric nitrogen, for example. Under ideal conditions, an entire ecologically coordinated, yet diverse, group of microbes can improve the soil in a myriad of ways)." However, this latter publication supplies specific microbes and micronutrients in limited ways (foliar application with sticky excipients, for example) and does not address the issue of how to convert large quantities of fecal biomass into soil builders.

The conversion of planetary vegetable and animal matter into large quantities of fecal coliform biomass on one hand, versus energy intensive chemical irrigation of increasingly impoverished top soil, on the other hand, has many serious problems. Greenhouse gases include CO2, CH4, and N2O, and are usually referred to in terms of CO2 equivalent effect on the atmosphere. Methane has a CO2 equivalent factor of about 23 (1 kg of released CH4 has the effect of 23 kg of CO2). The United States Department of Energy (www.eia.doe.gov/oiaf/1605/ggrpt/) estimates that 8 million megatons of CH4 (183 million MT CO2) were released into the atmosphere in 2002 by agricultural operations. This is 30% of all CH4 emissions in the U.S. and of the agricultural CH4 emissions, 94% was from livestock operations, of which about one third (about 3 million MT) was from decomposition of livestock wastes. While CH4 is the main greenhouse gas produced by bioconversion of animal waste, CO2 and NOX gases are also produced. NOX release into the atmosphere is particularly ominous, because of an estimated CO2 equivalence potency of 310.

The problems of CO2 release for artificial fertilizer formation, release of multiple, powerful greenhouse gases from agriculture waste and destruction of the soil result from an insufficient paradigm that focuses on chemistry feeding of plants and overlooks the soil biota. Any technology that can address the nutritional needs of the soil while minimizing energy use can provide immeasurable benefits.

SUMMARY OF THE INVENTION

An embodiment of the invention is a method for preparing a nutrient for the increase of topsoil microorganisms, primarily cyanobacteria and similar species, to increase soil fertility from an animal waste feedstock, comprising: kinetically lysing microbes of the animal waste at temperatures below 107 degrees centigrade, adding balanced calculated multiple minerals to the lysed waste product, adding a chelator to the lysed waste product in an amount suitable for chelating the added minerals, and converting the material into a pathogen free form of soil microorganism nutrients suitable for transport and use as a topsoil microorganism feeding fertilizer.

Another embodiment provides a topsoil microorganism feeding fertilizer, or biotic fertilizer, to increase the population of topsoil microorganisms to increase soil fertility by acceleration of the natural cycle. The fertilizer described in this invention works through increasing microorganisms, primarily cyanobacteria and similar species, naturally resident in the "A" Horizon, or topsoil, segment of arable soils, comprising mechanically shocked animal waste feedstock that substantially eliminates the population of living microorganisms in the waste to leave their ionic component elements to combine and enrich the carbon structures of the balance of the feedstock and to that material add a calculated balance of elemental nutrients reflective in formulation of those elemental nutrients vital to the reproduction and growth of soil microorganisms naturally resident in the "A" Horizon segment of arable soils, and to these combined ingredients add a chelation agent to increase the chelation of the ingredients before mixing the ingredients into a homogeneous material before converting the material into a form suitable for transport and use as a fertilizer.

Another embodiment provides a topsoil microorganism feeding fertilizer, or biotic fertilizer, to increase the population of topsoil microorganisms to increase soil fertility by acceleration of the natural cycle. The fertilizer described in this invention works through increasing microorganisms, primarily cyanobacteria and similar species, naturally resident in the "A" Horizon, or topsoil, segment of arable soils, comprising of balancing raw manure feedstock with elemental minerals, reacting the materials by processing them in a continually turning mixer, or pug mill before mechanically shocking the mixed components in a kinetic processor. The result of this process is a fresh nutrient which has been designed to accelerate the population of cyanobacteria and similar species naturally resident in the "A" Horizon segment of arable soils. The resulting material from this process is considered a fresh fertilizer and is not dried or further processed. This product can be land applied directly.

Another embodiment is a method of making a soil feeding fertilizer (biotic fertilizer) from animal waste feedstock, comprising kinetically lysing microbes of the animal waste at temperatures below 60 degrees centigrade, adding multiple minerals to the lysed waste product, adding a chelator to the lysed waste product in an excess amount needed for chelating the added minerals, and converting the material into a form suitable for transport and use as a fertilizer. Kinetic lysing may occur by sonication of a wet sludge or other suspension of the feedstock and the lysing can occur by accelerating the sludge material in a cooling fluid air stream to at least 100 miles per hour and striking the accelerated material onto a hard object. The material can be accelerated to about 350 miles per hour and struck onto an armored steel plate.

In another embodiment the low affinity chelator is added at the same time as or after adding the multiple minerals, and the chelator is a combination of at least two different chelators with different affinities for iron. The chelator can be selected from the group consisting of citrate, malonic acid and gluconic acid. The method may further comprise the step of adjusting the pH of the material to less than seven and may further comprise a pasteurization step of heating the material to less than 225 degrees Fahrenheit for at least 30 minutes. The method may further comprise the step of adding mycorrhizae spores from at least 4 different species and the material may be heated to more than 200 degrees fahrenheit for at least 1 hour. The pH of the product may be adjusted to a final value of between 5.9 and 6.2.

In another embodiment, a natural fertilizer comprises a majority of weight of an animal waste feedstock that comprises primarily destroyed bacteria; and one or more mineral nutrients chelated with an organic acid at more than 10% excess chelator; wherein the bacteria in the animal waste feedstock have a biochemical makeup consistent with non-thermal killing, and the fertilizer is at least 50% water soluble by weight. The natural fertilizer organic acid may be selected from the group consisting of citrate, fumarate, and malate and be present at more than 1 percent by weight of the dry weight of the fertilizer. The natural fertilizer may have at least 10 percent by weight soluble organic nitrogen.

Another embodiment is a fertilizer comprising animal waste feedstock that is substantially free of viable anaerobic bacteria; one or more mineral nutrients chelated with a 10 fold or more molar excess of organic acid; and at least 2 types of viable mycorrhizae spores and having a pH between 5 and 7. The fertilizer may comprise one or more mineral nutrients selected from the group consisting of zinc, manganese and copper and the organic acid may be citrate. The animal waste feedstock may be swine waste with a volatile nitrogen content of less than 1%. The mycorrhizae spores may be selected from at least two of the following: *Glomus mosseae, Gigaspora margarita, Glomus brasilianum, Glomus deserticola, Glomus Clarum, Glomus etunicatum*, and *Glomus intraradices* and the pH may be between 5.9 and 6.3. The nitrogen may be primarily from the feedstock and the total non-volatile nitrogen content may exceed 1 percent by weight. The chelator may be a small organic acid of less than 10 carbons and in a concentration of at least 100 milligrams per kilogram of fertilizer.

Another embodiment is a fertilizer comprising animal waste feedstock that is substantially free of anaerobic bacteria; between 0.5 and 6% percent by weight phosphorous chelated with an organic acid; at least 2 types of viable mycorrhizae spores; and wherein the fertilizer has a pH between 5 and 7 and a moisture content of less than 11%. More than half of the organic acid may be citrate and the fertilizer may comprise at least 4 types of mycorrhizae spores, wherein each spore type is present at a concentration of at least 100,000 spores per kilogram of fertilizer. The citrate may be in a molar excess with respect to inorganic phosphorous of between 1 and 10.

DETAILED DESCRIPTION

This invention arose from an insight based on an understanding of soil microbes and concerns the conception and understanding of an entirely new unique class of fertilizers. Topsoil microorganism feeding fertilizers, or biotic fertilizers, depend upon living organisms to convert fertilizer nutrients into ionic elemental forms that are stored in the soil as stable carbon molecular structure soil acids until required by plants. Plants use these nutrients to grow and then die, decompose, and begin the cycle all over again.

Without wishing to be bound by any one theory of how an embodiment operates, the inventor theorizes three actions that are natural and reflexive in all soils. The first action is the ability of soil bacteria to rapidly multiply when provided with the correct nutrition. With a doubling rate estimated by some scientists to be 15 minutes to one hour these bacteria can expand their numbers rapidly. Other than moisture, the factor which limits their reproduction is food. A topsoil microorganism feeding fertilizer, or biotic fertilizer, is specifically designed to provide food in the form and nature that is easily used by soil microbes. The second action is the fact that the lifespan of soil bacteria is short. What grows quickly can die quickly. The life span of soil bacteria is difficult to measure due to the nature in which it divides but it might be measured in minutes or hours. The third factor is the knowledge that these bacteria contain in their internal cells rich amounts of nutrients in a chelated ionic form that are the important nutrients in the growth of plants. A topsoil microorganism feeding fertilizer provides the fuel to a bacteria population that it requires in reproducing, excreting waste, and dying. Their populations swell to large sizes only to subside as the nutrients from the biotic fertilizer is consumed. The waste elements from this bloom remain in the topsoil as stable soil acids that can remain in the soil until used by crops. Due to their minute size and simple but very effective ability to digest organic material the elements inside their simple bodies are already in a form that a plant can easily use. Upon their death, the combined ionic elemental forms of carbon, oxygen, nitrogen, hydrogen, phosphorus, sulfur, potassium, magnesium, calcium, iron and trace elements are left in an ionic state in the soil in the form of soil acids. Soil acids are of immediate value to a plant that is growing in the immediate vicinity of the nutrients.

From these understandings comes a completely new theory of how to make and use a new fertilizer. We can now economically build and maintain microorganisms driven soil fertility on a predictable and reliable basis. The serious problems of the art were addressed with a biological strategy for producing soil building fertilizers that yielded unexpected results to plant growth. Without wishing to be bound by any one theory for this embodiment of the invention, it was considered that the soil microbes, their relatively fixed levels of protein and elemental content along with their ability to rapidly expand their numbers when provided the correct nutrition should be the basis of fertilizer that respects the soil. In an embodiment, an organic or "organic based" (i.e comprises some "organic" component) fertilizer to increase soil fertility can be manufactured by one or more of (and preferably all of): 1.) the design, balance, and manufacture of complex elemental nutrients in a carbon-based form that is efficient in providing soil microbes with the level and type of nutrition that allows them to rapidly reproduce, 2.) the "substantial elimination" of bacteria, fungus, and other microbial based life during the manufacture of these nutrients (i.e. decreased enough to prevent such microbes from competing with the naturally existing microbial life found in the "A" Horizon of the topsoil worldwide), 3.) the "substantial elimination" of living insects, insect larva, spores, casements, or other forms of insects which may be present in the organic material prior to and subsequent to the manufacturing process (i.e. to low enough levels to satisfy government agencies), 4.) the design of such nutrients so that they are in a physical form that allows them to rapidly and easily enter the "A" Horizon of the soil without having to undergo significant loss of nutrition and carbon energy as a result of bacteria and fungal decomposition on the "O" Horizon of the soil, or alternatively in the "A" Horizon when integrated into its structure, 5.) the design of such nutrients so they are, to a large degree, easily water soluble, 6.) the design and manufacture of such nutrients so that they are present in a homogenous fashion when applied to the "O" Horizon of the soil, 6.) the design and manufacture of such nutrients in a solid granular form, 7.) the design of such nutrients in a liquid form, 8.) the design of such nutrients in a soft, semi-solid form, the design of such nutrients in a gel form.

In an embodiment, this fertilizer is applied to the soil, than soil microbes, primarily bacteria, ingest its liquid and solid forms and by the increase in complete nutrition begin to increase their populations. Without wishing to be bound by any one theory for this embodiment, it is pointed out that soil microbes, primarily bacteria, have a short generation time from the time they come into existence until the time they split. With short life spans they soon die. After death their cell contents spill and their nutrient composition becomes an acidic carbon material rich in primary, secondary, and trace nutrients. This material, along with their waste products, is the basis for soil acids, both humic and fulvic which science has recognized as important sources of complex nutrition for use by plants and other microbes dwelling in the "A" Horizon of the soil. As topsoil soil dwelling bacteria, primarily cyanobacteria and similar species, increase, other forms of soil microbes, such as nematodes, protozoa, actiobacteria, microarthopods, and similar topsoil dwelling microorganisms that use bacteria and bacteria byproducts as a primary food source, can attack and ingest them to increase their numbers as well. Like bacteria, these microbes rapidly increase before their life cycle ends, and, like bacteria when they die their structures will decompose and they will add the contents of their bodies and their wastes to the soil acids.

Other soil microbes and fungus utilize soil acids as a source of nutrients. They expand their own populations before repeating the lysis sequence and leaving their organic structures and elemental forms of carbon nutrients that have been accumulated as a result of their lives to build additional sources of organic nutritional fertility, such as glomalin, exudates from mycorrihizae fungus, in the soil.

A theory of efficiency of transformation was also realized (without wishing to be bound by any one theory) that some organic nutrients, such as dried leaves have a very poor efficiency of transformation due to the fact that they contain little in the way of nutrients, having returned most of their nutrients to their plant or tree prior to falling and becoming desiccated. Compost has a very low efficiency of transformation due to the fact that most of its nutrients are lost during the thermophilic phase of composting as volatilized gas. Manure has a very low efficiency of transformation due to the fact that it contains competing bacteria in the form of anaerobic bacteria and other types of bacteria which work to decompose the manure even as it is deposited on or into the "A" Horizon. Any organic nutrient applied to the "A" Horizon that requires decomposition by action from bacteria, fungus, or other organism will spend a large portion of its inherent energy fueling its own decomposition.

Organic nutrients which easily enter the "A" Horizon without having to undergo decomposition have a greater advantage over organic soil amendments which must first undergo bacterial or fungal decomposition on the "O" Horizon. Some embodiments of the invention are related to this understanding of the efficiency of transformation of organic nutrients and, based on this understanding, a skilled artisan can derive many ways of using the invention as claimed. Biotic fertilizers and methods for their production are described next, which have a higher level of transformation, and, in some cases, mimic nature by more efficiently increasing the level of living bio-mass in the "A" Horizon which directly results in the increase of ionic forms of stored nutrients in the soil.

Mechanical Processing of Fecal Waste in Air and at Low Temperature for a High Solubility Fertilizer In a desirable embodiment, an animal waste feedstock is not composted, incinerated or substantially cooked, but instead mechanically treated, to rupture microorganisms enough to make them non-viable. Rather than turn the feedstock into cinders, or into relatively insoluble, sticky goo, the feedstock nutrients are converted into a more soluble form for direct feeding of soil. Desirably, at least 30%, 40%, 50% or more of the nutrients (carbon, nitrogen and minerals) are in a soluble form. The prepared fertilizer in fact is a more potent soil builder because more nutrients are available in a more soluble form and thus readily available for use. Furthermore, the additional feature of supplying the micronutrients in great excess of chelator ensures optimum solubility and opportunity for transport long after application and diffusion to a soil.

Yet another advantageous feature is the control of pH to a pH of about 6.1. The term "about" means pH of between 5.8 to 6.4 and more preferably between pH 6.0 to pH 6.2. Animal wastes on the other hand, generally are alkaline and often well above pH 7. Many methods for using such wastes first heat inactivate microbes but fail to make a product having a pH that is compatible with soil biota. Other "natural" or "organic" fertilizer methods generally either cook the biomaterial or incinerate at least part of the material. This tends to render more of the nutrients insoluble rather than leave them in a soluble state.

Mechanical disruption as described herein, in contrast, surprisingly was found superior to other methods that rely on high heat exclusively. Without wishing to be bound by any one theory for the operation of this embodiment, it is believed that after mechanical disruption at low temperatures, enzymes, which are not heat inactivated, are free to further degrade the animal waste for some time. This contributes to solubility of the final product. Two types of mechanical disruption are preferred, high velocity shock in air atmosphere, and sonic shock of aqueous suspension. In an embodiment, the mechanical shock occurs in the presence of oxygen, which facilitates the killing of anaerobe and facultative anaerobe bacteria.

After shock treatment, the material may be titrated to a lower pH, preferably with an acid chosen to have a dual role as a mineral chelator. Micronutrients preferably are added, and multiple types of mycorrhizae spores preferably are added.

Inexpensive Conversion of Inorganic Nitrogen into High Value Organic Nitrogen for Soil Feeding It was surprisingly discovered that mechanically disrupted fecal feedstock (chicken waste) can convert significant levels of added low level inorganic nitrogen (ammonia and/or urea) into higher organic forms, as desired for soil feeding. In this embodiment, fecal feedstock is disrupted, and the pH is adjusted by adding an acid to a lower pH value, such as less than 7.5, preferably between 5-7, more preferably between 5.5 to 6.5 and most preferably between 5.9 and 6.2. Inorganic nitrogen in the form of urea or ammonia is added (after, during, or preferably before the pH addition). The mixture is incubated for a period of time, such as for example, 2 minutes, 5 minutes, 10 minutes, 15 minutes or more, and then further dried and processed into a form suitable as a fertilizer. In an embodiment, primary nutrients, secondary nutrients and trace minerals and/or other macro minerals such as calcium and potash are added as suited for a desired fertilizer.

In an embodiment, urea is added to chicken manure feedstock before or (preferably) after mechanical disruption. Preferably urea is added to a final concentration of between 2 and 20% by weight, more preferably between 4 and 15% by weight and most preferably between 6 and 10% by weight. The total weight includes water, which after mechanical disruption preferably is between 20 and 80% moisture and more preferably between 25 to 50% moisture. The disrupted mixture preferably is at a temperature below 200 degrees Fahrenheit and more preferably between 90 degrees and 140 degrees Fahrenheit. The mixture may be adjusted to a lower pH and allowed to incubate (time before removal of water, for example by heat drying) for at least 1 minute, preferably at least 5 minutes and more preferably at least 10 minutes.

In an embodiment, urea is added to chicken manure as described above. In another embodiment urea is added to manure of another bird such as turkey. Without wishing to be bound by any one theory of this embodiment it is pointed out that titration of the mixture to a lower pH of around pH 6 decreases the activity of urease enzyme and facilitates the activity of enzymes that have a low optimum pH. Chicken do not make urea and chicken manure typically is devoid of urea, although the fecal bacteria have the ability to convert urea by carboxylation, and some energy is available for this. In another embodiment, carboxylic acid is added in high enough amounts (at least 1/10 the molar concentration of urea, and more preferably at least ½ the molar concentration of urea) to facilitate this reaction. In an embodiment, CO2 gas such as waste CO2 from a natural gas fired dryer, a power plant, or other combustion process may be added (by injection for example) into the mixture to provide HCO2. In this latter case, titration to maintain pH preferably is used.

In an embodiment, chicken manure is mixed with manure from a mammal (preferably hog), and which contains and/or is supplemented with extra urea. In an embodiment the ratio of chicken manure (measured as solid dry weight) to mammalian manure is between 1 to 12, and 1:1 and preferably between 1 to 5 and 1:1. In this embodiment the chicken manure helps process the urea of the mammalian manure. In an embodiment the feedstock is all from a mammalian species and no avian fecal waste is used. In yet another embodiment bacteria phage are added that are specific to bacteria in the fecal waste, to facilitate lysis of those bacteria. In another embodiment, enzymes or microorganisms having the enzymes, are added to facilitate one or more anabolic reactions that convert ammonia and/or urea into more complex forms having higher carbon content. In an embodiment, one or more enzymes or co-factors are added that facilitate ATP and or NADPH production. Such enzymes or co-factors may be supplied in the form of microorganisms (preferably freshly lysed) that are known sources of the enzymes or cofactors.

Manure with Fish as Primary Feedstock

A surprisingly good fertilizer is made by combining manure such as bovine manure, porcine manure, or even avian manure with fish. In this process, fish is treated with non-organic acid to hydrolyze the raw fish as allowed by the USDA NOP. The hydrolyzed fish is then optionally added to a process as described herein. This allows the use of non-organic acid to partially react with fish in an organic fertilizer. In an embodiment, ground fish is mixed with inorganic acid to form a weakly acidic mixture (pH from 4 to 6.5) and then added to a composition described herein. In an embodiment, the final pH is made acidic enough, as will be appreciated by a skilled artisan, to minimize the formation of volatilize amines and thereby limit odor from the fish component. In an embodiment the final pH is between 2.5 and 4.5 and the fish—acid mixture replaces at least some of the organic acid used in a process as described herein.

Without wishing to be bound by any one theory, it is believed that the high protein amine composition of fish neutralizes or partially neutralizes the non-organic acid, allowing the acid to both generate soluble nitrogen and become part of the organic fertilizer. In an embodiment, the combination of inorganic acid with fish results in a lower pH buffering material that allows the use of a strong acid as a weaker combined buffering ingredient. In an embodiment, between 0.1 to 40% of total soluble nitrogen arises from the fish. In another embodiment 0.5 to 5% of total soluble nitrogen arises from the fish. This process allows a lower manufacturing cost by lowering the over all cost of reactive materials.

Animal Waste Feedstock

The term "animal waste feedstock" means waste matter excreted from animals as feces and/or urine, such as but not limited to that from human (municipal sewage or sludge), cattle (beef, dairy, buffalo, veal, etc.), horses, sheep, swine, poultry (chicken, turkey, ostrich, pigeon, etc.), goat, mink, veterinarian, stockyard, stable, race track, rodeo grounds, fairgrounds, feedlot, sale barn, confined animal feeding operations, zoo, aquatic (fish, shrimp, etc.), elk (and other game), llama, alpaca, as well as other operations and sources of sewage or animal waste, and any mixtures thereof. Animal waste feedstock as used herein includes such matter along with other materials normally present in agricultural operations where such matter is produced, such as straw, bedding (which is typically shredded paper, wood chips, etc.), hair, feathers, insects, rodents, etc., whether the ratio of such matter to such other materials ranges from very low to very high. Animal waste feedstock includes matter in its raw form, any prepared form and mixtures thereof with other materials such as other bio matter (yard waste, green waste, etc.), additives, process aids, bone meal, fish meal and the like, including where the matter is fresh, fully bioconverted by composting, digestion, etc., or is at any stage in between.

In an embodiment, the animal waste feedstock typically has a moisture content between about 25% and about 70% by weight, preferably between about 20% and about 30% by weight and most preferably between about 30% and about 40% by weight. "Percent by weight," as used herein, is in reference to percent of the component in question based on the total weight of the mixture referred to. Animal waste feedstock of lower moisture content, for example, as low as about 10% by weight or even about 20% by weight can be processed in embodiments. The solids content in many embodiments is primarily organic solids and microorganisms, and when obtained from mammals, particularly fecal coliforms. As used herein "microorganism" is used to include bacteria, protozoa, fungi and algae.

Conversion into Suitable Form

Optionally, the feedstock is converted into a physical form most suited for the particular mechanical shock technique used to kill anaerobic (and facultative anaerobic) bacteria therein. In an embodiment, the animal waste feedstock is processed for mechanical shock by mechanical means, such as a front end loader, which drops the feedstock into a rock separator, mixer, and chopper unit. The feedstock can be further mixed and foreign objects separated in screw conveyers, then processed by mechanical shock. The feedstock also can be pre-mixed or conditioned for desired uniformity prior to loading into this system by a loader, e.g., in storage windows that can be combined and mixed.

Different animal feedstock can be processed by different methods prior to conversion into suitable fertilizer, as will be appreciated by a skilled artisan. In an embodiment, the goal of such pre-process is to decrease the moisture content of the solid product as much as possible, while separating and treating the contained moisture for reuse as gray water (e.g. wash water or irrigation water).

A wet feedstock, such as regular hog manure, should undergo a process to separate the solids from moisture before the solids can be converted into a topsoil microorganism feeding fertilizer. Dairy manure feedstock often is in two forms: a liquid form prepared by automated manure collection process, and a dry form when a farmer collects the manure with a tractor from loafing areas. The wet manure may undergo a separation process such as, for example, described by Sheets in U.S. Pat. No. 6,863,826 ("Animal waste effluent treatment"). A screw press separator or other equipment also can be used to separate liquids from the solids. Poultry manure can be used as a feedstock often as is, or may undergo a drying step before use.

Mechanical Shock (Mechanical Composting) at Limited Temperature via a Kinetic Processor The feedstock initially has viable bacteria, viruses, weed seeds, insect eggs, and other organisms that become inactivated at this stage without use of high heat (above 107 degrees Centigrade). These organisms constitute a large proportion of the wet mass and are mechanically shocked (preferably in the presence of air or oxygen gas) to remove their viability. This treatment also has an effect on other microbes in the feedstock, but preferably, a later pasteurization step is used to bring the total microbial viability load down to an acceptable level.

In an embodiment, the mechanical shock separates cells in the presence of oxygen, allowing oxidative killing or weakening of the cells. In a preferred embodiment, the mechanical shock is sufficient to break and thereby kill, bacterial cells and other microorganisms. In many cases, the feedstock has a large proportion of gram negative bacteria, which have cell walls. In an embodiment, mechanical activity (kinetic shock by collision with a metal wall, sonic air shock, or sonic shock in solution) mechanically shocks the bacteria enough to inactivate them.

Mechanical shock by kinetic thrashing preferably is used, wherein bits of the feedstock collide at more than 200, preferably more than 250, and yet more preferably more than 300 and most preferably about 350 miles per hour onto a solid surface such as an armored steel plate. Preferably the feedstock is accelerated in a cooling fluid air stream mixed with air and enters a turbulent stream of air that helps separate the particles, while accelerating them prior to collision. This process generally can inactivate most of the bacteria of the feedstock without cooking.

Sonication shock by high pressure sound waves in a fluid medium may be used to inactivate microbes of the feedstock without subjecting them to high (e.g. above 200 degrees Fahrenheit) temperatures. For example, in batch mode, animal waste may be treated with sonic energy. In a continuous process, such as that described by Sheets (see U.S. Pat. No. 6,863,826, particularly the methods and energy usage per gram material), low sonic energy may be used per kilogram of dry matter and cooking is avoided. Optionally, a flow stream thus treated may be further processed by the addition of micronutrients and chelator as described below.

Addition of Micronutrients

Multiple micronutrients are added and mixed into the feedstock material at any time, before mechanical shock, after titration, before titration or during titration. Micronutrient cations such as manganese, magnesium, copper, zinc and iron optionally may be added in chelated forms. In an embodiment, the chelated forms are prepared by a non-aqueous process such as that described in U.S. Pat. No. 6,670,494 issued to Trusovs on Dec. 30, 2003.

Representative micronutrients, and some representative forms are:

Zinc (zinc oxide, zinc acetate, zinc bensoate, zinc chloride, zinc citrate, zinc nitrate, zinc salicylate, ziram); iron (ferric chloride, ferric citrate, ferric fructose, ferric glycerophosphate, ferric nitrate, ferric oxide (saccharated), ferrous chloride, ferrous citrate ferrous fumarate, ferrous gluconate, ferrous succinate); manganese (manganese acetate, manganese chloride, manganese nitrate, manganese phosphate; copper (cupric acetate, cupric butyrate, cupric chlorate, cupric chloride, cupric citrate, cupric gluconate, cupric glycinate, cupric nitrate, cupric salicylate, cuprous acetate, cuprous chloride); boron (calcium borate, potassium borohydride, borax, boron trioxide, potassium borotartrate, potassium tetraborate, sodium borate, sodium borohydride, sodium tetraborate); molybdenum (molybdic acid, calcium molybdate, potassium molybdate, sodium molybdate); and cobalt (cobaltic acetate, cobaltous acetate, cobaltous chloride, cobaltous oxalate, cobaltous potassium sulfate, cobaltous sulfate). Of these micronutrients, the most important are Zn, Fe and Mn, but preferably others in the list are included in the supplementation to the shocked feedstock.

In an embodiment, micronutrients are added in a dry form after mixing into a powder. In an embodiment, one or more divalent cation minerals such as manganese and copper are pre-incubated with chelator(s) prior to mixing with other minerals. In another embodiment, divalent cations are added separately prior to adding of trivalent iron.

Addition of Chelator(s)

One or more chelators may be added before, during (preferably as chelate complexes with minerals) or after micronutrient addition. Preferably, the chelator is an "organic acid," that is, an organic carbon backbone molecule having one, two or more carboxyl acid groups such as citrate, malonic acid and gluconic acid. Preferably the organic acid has at least two carboxylic acid groups that are separated by at least one carbon atom, and more preferably at least two carbon atoms. Desirably the organic acid has between 2 and 20 carbon atoms. A nearly infinite range of chelators exist, as many fulvic and humic acids are desirable chelators. However, a chelator should not bind a nutrient too tightly because the nutrient has to be released to a plant. The chelator should be a weak binder but at a high enough concentration to allow near constant binding of minerals such as manganese and copper. In an embodiment, the chelator has an association constant for manganese at pH 6.0 that is at least five fold less than the association constant of ethylene diamine tetraacetic acid for manganese.

In a desirable embodiment citrate, or other chelator is added in at least ten fold, 25 fold or even 100 fold stoichiometric excess over the minerals. By adding such excess citrate, two problems of mineral transport are alleviated. One, the relative competition between metals for the same chelator, which for example, results in ferric ions decreasing the mobility of manganese ions, is neutralized by the excess opportunities for all ions to remain bound up by the excess citrate. Two, after addition to soil, the chelated minerals tend to stay chelated, and in solution longer, despite diffusion within the soil, due to excess citrate, which also diffuses.

In a preferred embodiment, micronutrients are added to the shocked feedstock before addition of chelator and are allowed time (at least 10 seconds, preferably at least 60 seconds, more preferably at least 5 minutes) to become bound up by naturally occurring chelators in the feedstock, including amino acids, monocarboxylic acids, dicarboxlic acids and other multiply charged moieties. An excess of chelator such as citrate then may be added. In a desirable embodiment, citrate or other acid is added in an amount sufficient to titrate the pH of the prepared mixture to below 7.0, preferably below 6.8, more preferably below 6.5, and most preferably below 6.2. In another embodiment, the micronutrients are added after the titration to a lower pH by acid addition.

A wide variety of chelators are contemplated with a wide variety of metal ions. In fact, most metal ions react with electron pair donors to form chelates. A preferred chelator has at least one pair of unshared electrons. A chelate is a cyclic complex that forms when two or more donor groups contained in a single chelator bind the metal cation. Polydentate ("many tooth") chelators are preferred because the lower entropy of these systems is thought to prevent dissociation of the complex during normal equilibrium shifts in aqueous systems. In particular, the association of each donor group with the common metal ion multiplies the binding affect, allowing long term binding, suitable for penetration as a net zero (or nearly net zero) charge through a barrier such as a mycorrhizal membrane.

The efficacy of a chelate is described by the stability constants ($K_f$) of the chelation systems. A stability constant is a complex formation proportionality constant; that is, the chelation reaction is dependent upon a given concentration of both the metal ion and ligand in solution. The higher the stability constant, the lower the concentrations of complexing agent and cation necessary for the chelation reaction to occur (or remain stable).

Carboxylic acids are known to complex metal ions only subsequent to $H^+$ or acid dissociation, that is, the organic acid-metal ion complexes are pH dependent. The highest cation stability constants are found in solutions with a pH greater then 7—for EDTA the greatest stability is approached at a pH greater then 12. The endpoint of an organic acid titration is the lowest pH value needed for the greatest abduction, that is, the endpoint is the lowest pH necessary for the optimum (highest) cation stability constant. It was discovered experimentally that pH below 6.5 and preferably between 5.9 and 6.1 worked best with feedlot material and the range of micronutrients needed for soil nutrition, using citrate as an added chelator.

Combinations of Chelates

In a desirable embodiment, more than one organic acid is added and acts as a chelator. Without wishing to be bound by any one theory for this embodiment, it is pointed out that different minerals added to the feedstock, and different minerals in soil to be treated by the soil fertilizer have different association constants with the chelators. In particular, some minerals such as manganese seriously compete with others for chelators and can gradually precipitate. The use of multiple added chelators of different types allow an overall improved (more soluble) chelation chemistry for the host soil by providing a range of dissociation strengths and times.

In particular, when manganese is applied to aerated soil, the manganese slowly, but inevitably oxidizes to insoluble manganese dioxide. However, if the manganese is very strongly chelated, this mineral can remain more soluble and available to mycorrhizae uptake for a longer time period, e.g. weeks or months. Such strong chelation of manganese ions requires high stability of the chelate with regard to hydrolysis, especially at a high soil pH. Equally important is a high stability with regard to other metal ions that compete for the chelator and thereby set free manganese ions. This problem is especially critical and well-known with ferric iron ions, which often are abundant in soils. Due to their tri-valent positive charge, the normal ferric state of iron ions forms very stable chelates with many chelating agents. The normal divalent state of manganous cation, on the other hand, forms chelates of lower stability than ferric iron ions in many cases.

In an embodiment, two chelaters are added, wherein one binds manganese with a higher affinity than iron under regular soil conditions. In an embodiment, manganese that is added to the shocked feedstock material is pre-bound to a high affinity chelator, which optionally binds manganese at least as well as to ferric ions. Desirably, two, three or even more types of chelators are added to accommodate the varied requirements of divalent and trivalent micronutrient cations. In an embodiment at least 2 different carboxylic acids (each preferably containing two or more carboxylic acid groups) are added to provide a range of chelation.

In an embodiment, an organic carboxylic acid is combined with an amine (particularly a diamine) to facilitate a stable +2 cation chelate in the presence of +3 cations such as ferrous iron. It was seen that a difunctional amine both quenches excess acid added for titration but also helps stabilize chelated minerals by participating in the formation of chelated complexs via hydrogen bonding, thereby creating a more stable metal-chelater complex. In a desirable embodiment, a naturally occurring chelator such as citrate is added and a difunctional amine such as a difunctional amine selected from the group consisting of organic diamines, hydroxyamines, polyamines, polyhydroxyamines and particularly 2-hydroxyethylamine, dimethylaminopropylamine and mixtures thereof are added, for improved complex formation and stabilization of the divalent cation.

Titration to a Lower pH

Animal waste often is at a higher pH than desired for a soil feeding fertilizer (biotic fertilizer) (biotic fertilizer). It was discovered that a lower pH of less than 7, preferably less than 6.5, more preferably between 5.9 and 6.2 and even more preferably between pH 6.0 and pH 6.1 provides a most efficacious fertilizer. Desirably, an organic acid such as citrate is added for the dual purpose of titrating to a lower pH as well as for chelation. In another embodiment, a stronger acid, such as phosphoric acid is added to lower the pH and citrate is added partly to balance pH and partly to act as a chelator.

In a desirable embodiment citrate, and/or other acid chelator is added in an amount suitable to decrease pH to below 6.5, preferably below pH 6.3 and most preferably between pH 5.9 and 6.1. During the mixing of wet material in the presence of air, oxidation reactions can lead to pH changes and off gassing. Accordingly, in a preferred embodiment, the pH is monitored and nitrogen gas added to at least partially displace the oxygen. In a desirable embodiment, the addition of acid and mixing is conducted under an atmosphere that is purged at least 50% (vol/vol) by added nitrogen.

Optionally, during or after addition of acid to lower the pH, one or more nitrogen compounds may be added as a base to quench the added acid. For example, a primary amine, secondary amine, tertiary amine, nitrile, or amide may be added. Most desirably a primary amine such as an amino acid or amino acid derivative is used. Typically, the nitrogen compound is added until the desired pH is reached.

In an embodiment, pH is monitored and compared to pH set targets or as a rate of change, atmospheric pressure is monitored, and ambient air temperature is monitored. If the pH drops too much or too fast, or if the air or mixture temperature is too high then nitrogen gas is added to the air space above the feedstock mixture to limit oxidation.

During titration, optionally a basic nitrogen compound may be added to quench the remaining introduced acid groups. Most preferred quenchers are organic amines having from 1 to about 20 carbon atoms. The more preferred organic amines are difunctional amines selected from the group consisting of organic diamines, hydroxamines (particularly 2-hydroxyethylamine and dimethylaminopropylamine), polyamines, polyhydroxyamines and mixtures thereof.

Soil Feeding Fertilizer (Biotic Fertilizer) (Biotic Fertilizer) s (Biotic Fertilizers): Six Selected Nutrients Contrary to teachings in this field, soil feeding fertilizer (biotic fertilizer) (biotic fertilizer) s were made with mineral compositions that differ from that used for direct plant feeding. In an embodiment, six nutrients were selected for soil feeding optimization (see table below). Most preferably, the following percentages of nutrients (expressed in weight percent of the mineral per weight of the final dried commercial product) are provided:

| Element | Concentration Range | Preferred Concentration Range |
|---------|---------------------|-------------------------------|
| Potassium | 0.5% to 8% | 1% to 4% |
| Sulfur | 0.5% to 6% | 1% to 5% |
| Magnesium | 0.2% to 1.6% | 0.01% to 0.06% |
| Boron | 0.003% to 0.05% | 0.01% to 0.04% |
| Iron | 0.1% to 1% | 0.1% to 0.3% |
| Molybdenum | 0.0001% to 0.002% | 0.0004% to 0.0008% |

Each mineral weight does not include any chelators that may be present or the weight of carbon structures that are a form of the minerals. Each of the stated concentrations assumes plus or minus 10% of the value, assuming 5% inaccuracy of measurements and variations in moisture content (using 12% moisture as a reference). In an embodiment, no such assumption is made and the exact values are intended, assuming 30% water in the final product. The referenced weight percentages assume that the fertilizer is at a low enough moisture (30%) to all free flow during use, as is custom in this industry. A liquid fertilizer would have commensurately higher moisture than a dry fertilizer but the same ratios in this table are intended for liquid fertilizers as well. These concentrations can be calculated for a fertilizer having 90% moisture by factoring out the weight of the additional water, setting the value to how much the mineral would contribute to the total weight if the 90% water were reduced to the standard 30% moisture value. In an embodiment, a fertilizer is provided that has at least 4 of these 6 minerals in the concentration range stated. Preferably at least 4 of the minerals are within the preferred concentration. In an embodiment, a fertilizer is provided that has at least 5 of these 6 minerals in the concentration range stated. Preferably at least 5 of the minerals are within the preferred concentration. In a more preferred embodiment, a fertilizer is provided that has all 6 minerals in the concentration range stated. Most preferably all 6 of the minerals are within the preferred concentration. Preferably 40-80% by weight of the fertilizer is water soluble, and more preferably between 50-70% is soluble. When converted to particle sizes of 40 microns or less, more than 80% and preferably more than 90% becomes water soluble. In an embodiment, the fertilizer additionally has (per unit weight) of between 0.5% to 10% organic nitrogen and preferably between 1 to 5% organic nitrogen.

Chelators of the minerals are preferred. In an embodiment enough chelator (such as EDTA, EGTA, or more preferably citrate or other organic polyacid) is present to bind up at least half of the minerals, and preferably all of the minerals. In a particularly desirable embodiment, chelator (preferably an organic polyacid) is present in at least 2 fold, 5 fold or even at least 10 fold molar excess with respect to the minerals. This latter embodiment facilitates movement within the soil after addition.

In another embodiment, a concentrated mineral composition (liquid or dry) is provided that has 4, 5, or most preferably all six of these minerals in the ratios provided. The concentrated mineral composition can be added to soil directly, or indirectly by addition to a bulk fertilizer or other material. In yet another embodiment, a concentrated mineral complex is provided that provides these tabular concentrations after addition to a fertilizer that already has one or more of the listed minerals.

In an embodiment, minerals in the concentrations listed above are provided in an "organic" fertilizer based on animal waste feedstock. In another embodiment, minerals in the concentrations listed above are provided in an "organic base" fertilizer based on animal waste feedstock.

In an embodiment, most or substantially all of the nitrogen is in the form of organic soluble nitrogen and more than half of the mass is water soluble. This is a very unusual property that yields particularly desirable soil feeding properties. The water soluble nitrogen is in a more complex form than urea and the fertilizer is particularly distinguished from other fertilizers on this basis. In an embodiment at least 75% or preferably at least 90% of the nitrogen is both water soluble and organic (in chemical complexes/compounds that have a greater abundance of carbon than urea).

Homogeneity of the Fertilizer

An embodiment provides superior soil feeding properties by providing a complement of desired minerals together to a soil microbe. An assumption in the fertilizer field is that minerals of a fertilizer are washed into a soil and made available to (relatively large) plant roots for a given plant. All minerals of a complement needed for plant growth are not required at a given spot on a given root hair because it is the whole plant that is being fed. In contrast, embodiments as described herein feed soil microbes and desirably provide a full complement of nutrients to those microbes. Since many microbes are about 1 micron in size and often are immotile, it is best that a particle or grain of soil feeding fertilizer (biotic fertilizer) (biotic fertilizer) provide each nutrient at the same place and time on a microscopic scale.

Accordingly, an embodiment provides a homogeneous fertilizer. In an embodiment, "homogeneous" means that at least 90 percent of the fertilizer particles (pellets, prills, grains, kernels, capsules etc but not including fines or powders that rub off) contain at least 4 of the 6 nutrients listed above in the recited concentrations. In another embodiment, at least 90 percent of the fertilizer particles contain at least 5 of the nutrients. In a most preferred embodiment at least 90 percent of the fertilizer particles contain all 6 of the listed nutrients. Other nutrients not listed in the table of course may be present.

Soil Feeding Fertilizer (Biotic Fertilizer) (Biotic Fertilizer) s (Biotic Fertilizers): Complete Table of Desirable Nutrients In an embodiment, more than 6 nutrients are controlled in a desirable fertilizer. The following table indicates desired ranges of these nutrients. In particular, carbon and nitrogen may be controlled to a concentration as shown. Other preferred concentrations of other nutrients may be added singly, or up to all as desired. Preferably 40-80% by weight of the fertilizer is water soluble, and more preferably between 50-70% is soluble. When converted to particle sizes of 40 microns or less, more than 80% and preferably more than 90% becomes water soluble. In an embodiment, the fertilizer additionally has (per unit weight) of between 0.5% to 10% organic nitrogen and preferably between 1 to 5% organic nitrogen.

| Element | Concentration Range | Preferred Concentration Range |
|---|---|---|
| Carbon | 15% to 40% | 16% to 25% |
| Hydrogen | 1% to 14% | 4% to 10% |
| Nitrogen | 1% to 16% | 1% to 7% |
| Calcium | 1% to 20% | 1.5% to 10% |
| Phosphorus | .5% to 6% | 2% to 4% |
| Potassium | 0.5% to 8% | 1% to 4% |
| Sulfur | 0.5% to 6% | 1% to 5% |
| Sodium | .01% to .05% | .01% TO .04% |
| Chlorine | .1% to 1% | .01% TO .04% |
| Magnesium | 0.2% to 1.6% | .01% TO .06% |
| Boron | 0.003% to 0.05% | 0.01% to 0.04% |
| Chromium | 0.003% to 0.05% | 0.003% to 0.05% |
| Cobalt | .00001% to .001 | .00025% to .0009% |
| Copper | .01% to 5% | .01% to .07% |
| Fluorine | .00001% to .0001% | .00025% to .0009% |
| Iodine | .00001% to .0001% | .00025% to .0009% |
| Iron | 0.1% to 1% | .1% TO .3% |
| Manganese | .01% to 5% | .01% to .07% |
| Molybdenum | 0.0001% to 0.002% | 0.0004% to 0.0008% |
| Selenium | .00001% to .0001% | .00025% to .0009% |
| Silicon | .00001% to .0001% | .00025% to .0009% |
| Tin | .00001% to .0001% | .00025% to .0009% |
| Vanadium | .00001% to .0001% | .00025% to .0009% |
| Zinc | .01% to 5% | .05% to 1% |

Final Mechanical Processing

After titration to a desired pH, the fertilizer preferably is granulated, agglomerated and dried in a temperature regulated dryer that does not increase the temperature above 225 degrees Fahrenheit for a time period for pasteurization. Preferably the temperature does not exceed 300 degrees Fahrenheit, more preferably not more than 275 degrees Fahrenheit and most preferably not more than 250 degrees Fahrenheit. Preferably the fertilizer is dried for at least 30 minutes, and more preferably for at least 60 minutes.

As used herein the term "granulated," "granule," "granulating" and the like refer to any granular form of the material or product produced by this embodiment, including conventional granules, powder, dust, crumbs and the like, produced by conventional granulation processes and equipment, including crushing or crumbling previously formed pellets or prills. The term "pellets," "pelletizing" and the like refer to any pellet form of the materials or products produced, including cylindrical, bullet, spherical or other shape, typically made by conventional pelletizing processes and equipment, such as by extruding a slurry or paste and cutting, chopping, or breaking the extrudate to the desired size.

Addition of Mycorrhizae Spores

Mycorrhizae spores desirably should be added to the fertilizer, preferably after final mechanical processing. Preferably at least two varieties of spores are added, more preferably at least three varieties and most preferably at least four varieties are added. Spores in a dried form may be added as a dusting to the drired fertilizer.

Mycorrhizae spores are mature shelf-stable spores, and have greatly improved performance compared to "propagules," which are hyphae fragments. Desirable varieties of mycorrhizae include, for example, endomycorrhizae such as *Glomus mosseae, Gigaspora margarita, Glomus bra-silianum, Glomus deserticola, Glomus Clarum, Glomus etunicatum*, and *Glomus intraradices*; and ectomycorrhizae such as *Pisolithus tinctorius* and *Rhizopogon* species.

In a desirable embodiment, designer fertilizer is produced having added mycorrhizae material selected for protection for specific plant species or by suitability for a particular geographic location. For example, an end user may contact the fertilizer maker, or distributor and request fertilizer with added mycorrhizal material (preferably spores) that are particularly efficacious for a particular plant or condition. For example, plants grown in the presence of a pathogenic fungus may be selected to obtain a good strain of mycorrhizae and the mycorrhizae population expanded by a known method. Spores formed are harvested and stored by the fertilizer maker or distributor. Upon request, spore cultures suited for particular plants or geographic regions are added, for example, via light dusting, on the fertilizer prior to packaging or shipment.

Use of the Fertilizer to Feed Soil by the Increase of Topsoil Microorganisms

In an embodiment, soil feeding is carried out by the application of topsoil microorganism feeding fertilizer (biotic fertilizer) prepared as described here. Surprising results of greater plant resistance to infection and improved plant growth without added chemical fertilizer were obtained. In a preferred method, biotic fertilizer as described above is provided that contains at least 2 fold molar excess of citrate compared to added divalent cation minerals, and at least 3 different types of viable mycorrhizal spores. Preferably, the biotic fertilizer contains at least 5 fold molar excess of citrate and even more preferably the organic fertilizer contains at least 10 fold molar excess of citrate. In a preferred embodiment the fertilizer contains at least 4 different types of mycorrhizal spores and more preferably at least 10 different types of mycorrhizal spores.

The fertilizer further comprises a relative absence of incinerated or cooked microbial protein and instead consists of at least 6 percent soluble protein, measured as water soluble protein per total (insoluble plus soluble) protein nitrogen, more preferably at least 10% soluble protein and most preferably at least 25% soluble protein. In an embodiment, the fertilizer further has a relative absence of incinerated or cooked soluble carbon, measured as water dispersible (soluble and suspended) carbon per total carbon. Preferably the fertilizer has at least 20 percent water dispersible carbon.

The fertilizer as described above is applied to soil by spreading on the surface, but more preferably by working into the top 6 inches of the soil. After one month, the treated soil is tested for Mycorrihizae and the amount of total Mycorrihizae is found significantly increased. Plants subsequently introduced to the soil are found to grow well without further addition of chemically manufactured fertilizer. Plants also found to grow better compared to soil treated with a cooked or incinerated animal waste feedstock.

Without wishing to be bound by any one theory of this embodiment, it is believed that in the presence of a high concentration of low molecular weight, low affinity chelator, the chelator mineral complexes easily penetrate the cellular structure of a plant's roots carrying into the internal structure of the root the dissolved elemental nutrients. This ability dominates and is instrumental to an increase of fertility of topsoil in the "A" horizon when compared to sub-soil found in the "B" horizon, the layer immediately under the "A" horizon. Furthermore, soil microbes have an extremely rapid reproduction doubling time. As a result, when provided with the nutrition to do so, they can expand their numbers at an extremely high speed. This happens more readily with the high solubility natural fertilizer described herein.

When fertilizer as described herein is applied, soil microbes are provided with the nutritional assets to expand their populations. This expansion occurs in several populations of soil microbes on a sequential basis as some provide a food source for others. For example as the bacteria population increases, so does the nematode population since bacteria are a preferred food of nematodes. As this occurs, soil microbes transform the organic based nutrients of a fertilizer described herein into soil acids and the carbon chemicals compounds that are associated with soil microbes.

Soil microbes generally contain 90% protein, or approximately 14% nitrogen, along with a complete spectrum of elemental nutrients, including phosphate, potassium, calcium, sulfur, magnesium, boron, chlorine, cobalt, copper, iron, manganese, molybdenum, sodium, zinc, and other trace nutrients which are of the exact nature and type to produce rapid protein synthesis in plants and provide plants with all the nutrients to achieve their full genetic potential. When soil microbes die however, they leave the nutrients in the soil, or in some cases, go around on multiple cycles as food for other soil microbes before finally leaving their nutrients in the soil.

This process distinctly differs from the soil fertility provided by chemical fertilizers based on synthetic inorganic nitrogen. Chemical fertilizers generally provide plants with water soluble nutrients that the plant can directly uptake and use. Fertilizers as described herein, on the other hand, expand organic nutrients, including important organic nitrogen components, which contrary to some current agronomic theory can be used directly by plants to sustain protein synthesis.

Without wishing to be bound by any one theory for certain embodiment, it is pointed out that growers have not understood or appreciated the concept of Efficiency of Transformation, a theory of the inventor, which is the basis for embodiments described herein. This theory is based on the understanding that all organic materials have different levels of transformation from their soil physical forms into stable stored carbon forms in topsoil. These different levels are the result of the physical nature and nutrient content of different organic materials and the amount of energy consumed during the decomposition period prior to the entry of the remaining nutrients into the topsoil. Dried leaves, for example have a very low efficiency of transformation. They return the majority of their nutrients to the plant or tree prior to dropping. As a result they have little nutrients contained in them to feed the topsoil microorganisms which will convert them from a solid material into stored carbon nutrients in the soil. Leaves, like most applied organic nutrients are mostly consumed by bacteria and fungal action before their remaining nutrients enter into the topsoil to form soil fertility. For this reason a ton of dried leaves has a low efficiency of transformation.

Compost has only a little higher level of efficiency of transformation due to the fact that most of its nutrients have been lost in the thermophilic phase of composting where most of the nutrients are volatilized into the atmosphere. As a result, most of compost is composed of humin, a low-reactivity form of carbon, which carries little in the way of nutrients into the topsoil. It also has a low efficiency of transformation. Manure has an unpredictable and unreliable efficiency of transformation due to the fact that it contains resident populations of bacteria and fungus that are working to consume and volatize the manure. These microorganisms are actually in competition with microorganisms resident in topsoil for the nutrients contained in manure. It is the Efficiency of Transformation of an organic product that will determine the resulting increase of soil fertility that occurs when organic materials are added to the soil.

Each cited publication and patent application specifically is incorporated by reference in its entirety. Methods and materials, but not necessarily explicit or contextual definitions of words in cited references that contradict meanings used herein specifically are incorporated by reference, and have not been repeated in this specification for the sake of brevity.

I claim:

1. A low temperature method of converting urea or ammonia to a higher carbon form comprising:
   providing or making a mechanically disrupted feedstock of animal waste prepared by high velocity shock in air atmosphere; decreasing the pH of the feedstock by addition of an acid; adding at least one of urea and ammonia to form a mixture; allowing incubation of the mixture for at least 2 minutes to allow conversion of the at least one of urea and ammonia into a higher organic form; and drying the mixture; wherein steps before and during the incubation are carried out below 60 degrees Centigrade and the mechanically disrupted feedstock is not composted, incinerated or substantially cooked by a heat denaturing step, but shocked to substantially inactivate microorganisms and leave the microorganisms' contents substantially in a soluble form.

2. The method of claim 1, wherein the pH is decreased to between pH 5.8 and 6.5.

3. The method of claim 1, wherein urea is added to a final concentration of at least 5 percent by weight.

4. The method of claim 1, wherein the mixture is allowed to incubate for at least 5 minutes between 32 and 60 degrees Centigrade.

5. The method of claim 1, wherein the animal waste is chicken feces and the animal waste makes up at least 66% by weight of the mixture.

6. The method of claim 1, wherein the high velocity shock is at least 100 miles per hour velocity striking a hard object.

7. A fertilizer production method of converting urea or ammonia to a higher carbon form in fertilizer without composting, incinerating or substantially cooking feedstock comprising:
   providing a a feedstock of animal waste between 20 and 80% moisture; kinetically shocking the waste sufficiently to break and thereby kill bacterial cells and other microorganisms and leave the microbial contents substantially in a soluble form, decreasing the pH of the feedstock before or after shocking by addition of an acid;
   adding at least one of urea and ammonia to form a mixture; allowing incubation of the mixture for at least 2 minutes to allow conversion of the at least one of urea and ammonia into a higher organic form; and drying the mixture.

8. The method of claim 7, wherein the mechanically disrupted feedstock of animal waste is prepared by subjecting the waste to kinetic shock by collision with a metal wall of at least 100 miles per hour.

9. The method of claim 8, wherein the high velocity shock is about 350 miles per hour velocity striking an armored steel plate.

10. The method of claim 8, wherein the feedstock is maintained below 200 degrees Fahrenheit.

11. The method of claim 7, further comprising the step of adding viable Mycorrhizae after drying the mixture.

12. The method of claim 7, wherein the animal waste is chicken manure.

13. A method for making high solubility fertilizer from animal waste comprising:

supplying animal waste between 20 and 80% moisture;
subjecting the waste to high velocity shock in air atmosphere without heating above 200 degrees Fahrenheit;
adding acid to decrease pH to between pH 5-7;
incubating for a period of time to allow conversion of inorganic nitrogen into organic nitrogen; and drying.

14. The method of claim 13, wherein the added acid is an organic acid that chelates metals.

15. The method of claim 13, further comprising adding at least 5 minerals selected from the group consisting of potassium, sulfur, magnesium, boron, iron and molybdenum are added.

16. The method of claim 15, further comprising the step of adding a carboxylic acid chelator in at least 10 fold stochiometric excess to the minerals in the mixture.

17. The method of claim 16, wherein the chelator is citrate.

18. The method of claim 13, wherein the high velocity shock is at least 100 miles per hour velocity striking a hard object.

19. The method of claim 18, wherein the high velocity shock is about 350 miles per hour velocity striking an armored steel plate 20. The method of claim 13, wherein the animal is a bird.

* * * * *